US006293099B1

(12) United States Patent
Kamiya

(10) Patent No.: US 6,293,099 B1
(45) Date of Patent: Sep. 25, 2001

(54) HYDRAULIC CIRCUIT FOR FORKLIFT

(75) Inventor: Kazushi Kamiya, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/340,773

(22) Filed: Jun. 28, 1999

(51) Int. Cl.[7] ........................ F16D 31/02

(52) U.S. Cl. ........................ 60/421; 60/484; 60/486

(58) Field of Search ........................ 60/421, 422, 427, 60/428, 429, 484, 486

(56) References Cited

U.S. PATENT DOCUMENTS 3,443,380 * 5/1969 Karazija ........................ 60/421
4,449,365 * 5/1984 Hancock ........................ 60/422

FOREIGN PATENT DOCUMENTS 56-84600 12/1954 (JP) .
62-249897 10/1987 (JP) .
1-104599 4/1989 (JP) .

* cited by examiner

*Primary Examiner*—Edward K. Look
*Assistant Examiner*—Thomas E. Lazo
(74) *Attorney, Agent, or Firm*—Morgan & Finnegan, LLP

(57) ABSTRACT

This invention relates to a hydraulic circuit for a forklift, and intends to lift a fork for lifting in high speed, or to inch the fork little by little, as occasion demands. In this hydraulic circuit, a first electric motor for driving a first electric motor disposed on a first route extending from a tank to a lift cylinder is on-off controlled. A check valve disposed on the first route downstream of the first hydraulic pump allows only an oil-flow from the oil tank to the lift cylinder. A second motor for driving a second electric motor disposed on a second route extending from a tank to a lift cylinder is PMW-controlled. A flow controlling valve is disposed on the second route downstream of the second hydraulic pump and including an electro-magnetic valve operated associating with the PMW-controlling of said second electric motor. A separating element hydraulically separates the check valve and the electro-magnetic valve of the flow controlling valve.

13 Claims, 6 Drawing Sheets

HYDRAULIC CIRCUIT FOR FORKLIFT

DETAILED EXPLANATION OF THE INVENTION

1. Field of the Invention

The present invention relates to a hydraulic circuit for a forklift, in particular it relates to the hydraulic circuit which can shift( lift) at least a fork for lift (hereinafter referred to "fork") over a long stroke in high speed, or can inch position of the fork little by little or gradually, as the occasion demands.

2. Related Background Art

Generally, a forklift has at a front side a lifting device including the fork for lifting a load, and this lift is lifted vertically by a hydraulic circuit. The hydraulic circuit generally includes passages or routes extending from a tank to a lift cylinder, a hydraulic pump for supplying an operating oil (hereinafter referred to "oil"), an electric motor for driving the hydraulic pump, the lift cylinder having a piston connected to the fork to lift it vertically, and a flow controlling valve.

For lifting the load to a high position by lifting operation of the lifting device, it is desirable that the lift cylinder has long stroke, and for lifting the load to a high position in short time it is necessary that large amount of the oil is supplied to a bottom portion of the lift cylinder in short time to lift the fork in high speed. The lifting speed of fork is determined by the number of rotations of the electric motor and allowable flowing amount through the flow controlling valve, and it is sufficient to supply the large amount oil by the large-size hydraulic pump, when only increase of the fork lifting speed is considered.

However, in addition to the high-speed lifting of the fork, the operating characteristics of inching of the fork should be considered, in determining the number of rotations of the hydraulic pump and allowable flowing amount of the flow controlling valve. That is, for inching the fork, the hydraulic pump should supply the oil in high response even for the oil supplying of small amount. Thus, two conflicting characteristics, i.e. the characteristic to supply the small amount of oil in high response and the characteristic to supply the large amount of oil in short time, are required for the hydraulic circuit for lifting the fork.

By taking the above circumstances into consideration, there have been known some related art in which the lifting speed of fork is controlled in two steps. For example, in Japanese Unexamined (KOKAI) U.M. No. 56-84600, as shown in FIG. 5, two routes 204 and 206 are provided between an oil tank and a lift cylinder 202 (check valve 216 is disposed between the routes 204 and 206), and on each route a hydraulic pumps 208 or 210, and a electric motor 212 or 214 are disposed. For shifting the piston 218 slowly only the hydraulic pump 208 and the electric motor 214 are operated, and for lifting the piston quickly both hydraulic pumps 208, 210 and the hydraulic motors 212, 214 are operated. However, since both of the electric pumps 212 and 214 are on-off controlled, a very small amount of oil is hardly supplied to the piston in high response, so inching of the piston 218 is difficult if only the electric motor 214 is driven for the inching.

In Japanese Unexamined (KOKAI) Patent No. 62-249897, as shown in FIG. 6, on a main-route 226 extending from a lifting pump 22 2 to a lifting cylinder 224 a sub-route 228 is provided, and a switching valve 230 and a logic valve 232 are respectively disposed on the main-route 226 and the sub-route 228. On a pilot route 234 extending from a pump 223 a remote-control valve 238 acting onto a pilot switching valve 236 co-operating with the switching valve 230 is disposed, and on a route 240 a pilot switching valve 242 acting onto the logic valve 232 is disposed. By controlling the oil flow in the pilot route by the remote control of the remote-control valve 238, the pilot switching valve 236, i.e. the switching valve 230 is switched, so that the oil flow in the route 240 is controlled.

When the fork is lifted in low speed, the switching valve 230 is switched to flow the oil only through the main route 226. When the fork is shifted in high speed, the remote-control valve 238 is operated to switch the pilot switching valve 236 to thereby supply the oil through the route 240. Thus, the logic valve 232 is opened to supply the oil also through the sub-route 228. However, because the motor 222 is on-off controlled, a very small amount of oil is hardly supplied to the cylinder 224, so inching of the fork is difficult, which is same as the hydraulic circuit in FIG. 5.

In a hydraulic circuit shown in FIG. 7, on a route 254 extending from a tank 250 to a lift cylinder 252 a hydraulic pump 256, a electric motor 258 which is chopper-controlled, a controlling valve 260, and a flow regulator 270 are disposed. A first adjusting valve 274 in the controlling valve 260 has three positions 262, 264 and 266 respectively corresponding to a lifting, lowering and neutral.

When the fork is lifted in high speed, the first adjusting valve 274 is switched to the position 262, and the lever (not shown) is operated to make the number of rotation of the motor 258 maximum.

In this way, large amount of the oil is supplied to a bottom portion of the cylinder 252 through the route 254. On the other hand, in inching the fork, the lever is operated to decrease the number of rotations of the motor 252.

However, in this hydraulic circuit, the first adjusting valve 274 is switched corresponding to the high speed lifting or the inching of the fork, and the electric motor 258 is chopper-controlled to change the number of rotations. Such arrangement is convenient for the inching of the fork, but inconvenient for the high speed lifting of the fork. Here, for lifting the fork in high speed, the motor 258 and the first adjusting valve 274 need to be large-sized, which however makes the operating characteristic of inching inaccurate due to a flow force in the first adjusting valve 274 and a inertia of the electric motor 258.

In this hydraulic circuit, in addition to the fork, a reach mechanism and tilt mechanism are provided, and they are controlled by a second adjusting valve 276 disposed side by side in the controlling valve 260.

Further, in Japanese Unexamined (KOKAI) Patent No. 1-104599, as shown in FIG. 8, on a first route 284 extending from a pump 280 to a lift cylinder 282 a controlling valve for lift 286 is disposed, and on a second route 290 branched from the first route 284 and extending to a reach cylinder 288 a restrictor 291 and a controlling valve for reach 292 is disposed, both of which cylinders are chopper controlled.

When both of the reach and lift are driven (FIG. 8 shows this state), the controlling valve for reach 292 is changed to a position A1 while the controlling valve for lift 286 is changed to a position B1 and the pump P is rotated by the maximum speed. The oil is supplied to the reach cylinder only through the restriction 291, so that the oil is supplied also to the lift cylinder 282 suitably.

When only the reach is driven, the controlling valve for reach 292 is changed to the position Al while the controlling valve for lift 286 is changed to the position B2, and the pump P is chopper-controlled to be rotated by the number of rotations smaller than the maximum number of rotations (duty ratio: 60 to 80%), for supplying the oil to the lift cylinder 282 without passing through the restriction 291. Thus, the energy for driving the pump P is saved. When only the lift is driven, the controlling valve for reach 292 and the controlling valve for lift 282 are respectively changed to the position A2 and B1, the pump P is rotated by the maximum number of rotations, and the oil is supplied to the lift cylinder 282 without passing through the restriction 291.

In this hydraulic circuit, the pump P is chopper-controlled both when the lift cylinder 282 and the reach cylinder 288 are driven, and when only the lift cylinder 282 is driven, so that the fork is hardly lifted in high speed although it may be inched suitably.

SUMMARY OF THE INVENTION

The present invention is made in view of the above circumstances, and has an object to provide a hydraulic circuit which is to be used for a forklift, and which can lift at least the fork with supporting the load thereon, in high speed over a long stroke and can inch the fork little by little.

For achieving the above object, in the present invention, a hydraulic circuit for supplying an oil from an oil tank to at least a lift cylinder is comprised of a first route extending from the oil tank to the lift cylinder; a first hydraulic pump disposed on said first route; a first electric motor on-off controlled for driving said first hydraulic pump; a check valve disposed on said first route downstream of said first hydraulic pump for allowing only an oil-flow from the oil tank to the lift cylinder; a second route extending from the oil tank to the lift cylinder; a second hydraulic pump disposed on said second route; a second electric motor chopper-controlled for driving said second hydraulic pump; a flow controlling valve disposed on said second route downstream of said second hydraulic pump and including an electro-magnetic valve operated associating with the chopper controlling of said second hydraulic meter; and separating means for hydraulically separating said check valve and said electro-magnetic valve of said flow controlling valve.

According to the present invention, by driving at least the first hydraulic pump by the first electric motor which is on-off-controlled, relatively large amount of the oil is supplied to the lift cylinder in short time. To the contrary, by driving the second hydraulic pump by the second electric motor which is chopper-controlled, the relatively small amount of oil is supplied to the lift cylinder little by little in high response.

PREFERRED EMBODIMENT

Hereinafter, a preferred embodiment of the present invention will be explained with reference to attached drawings, but it is noted that the present invention is not limited to these embodiments and various modifications are possible within the scope of the present invention.

Figure 1:
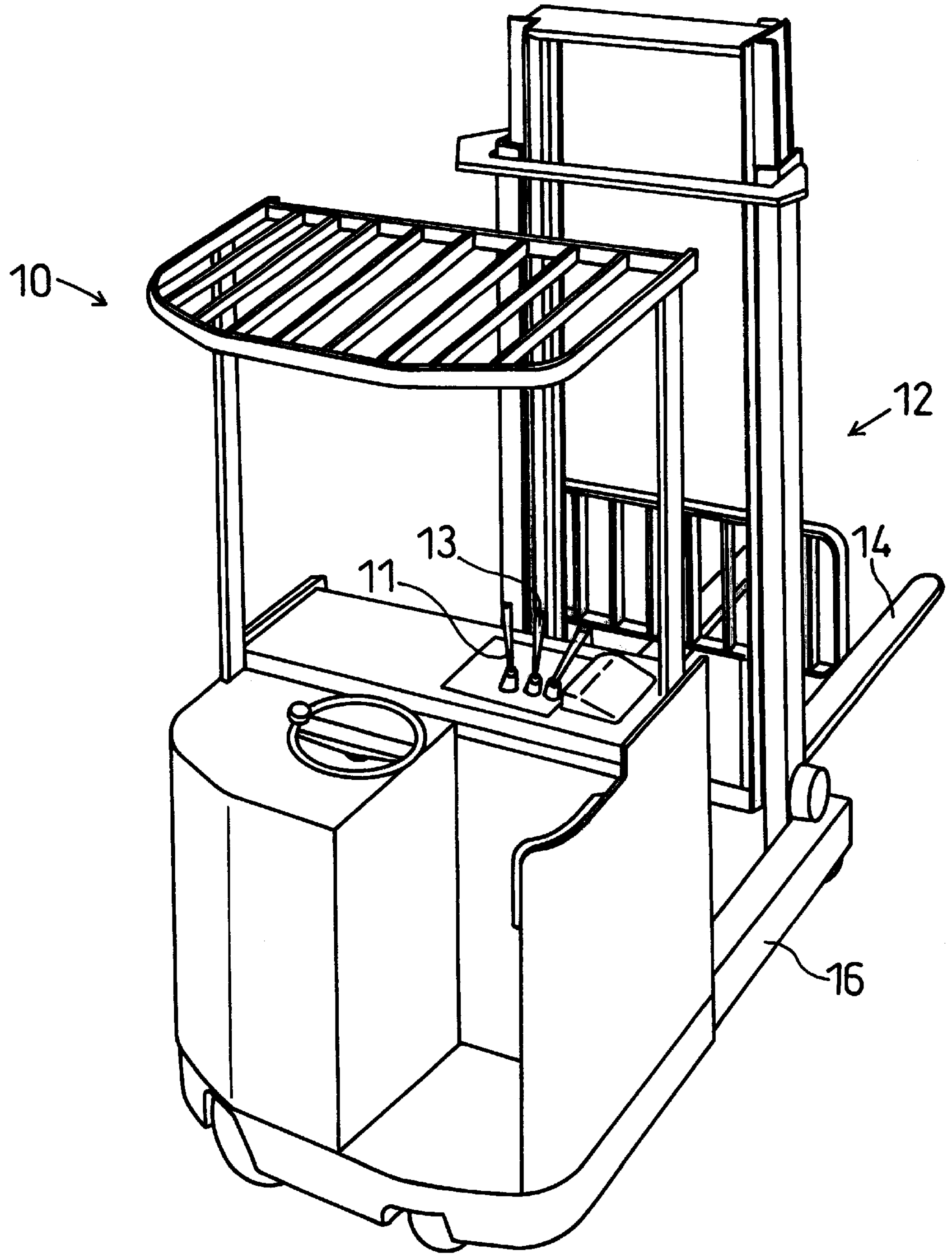
FIG. 1 is an appearance view of a forklift to which the present invention is applied.
Figure 2:
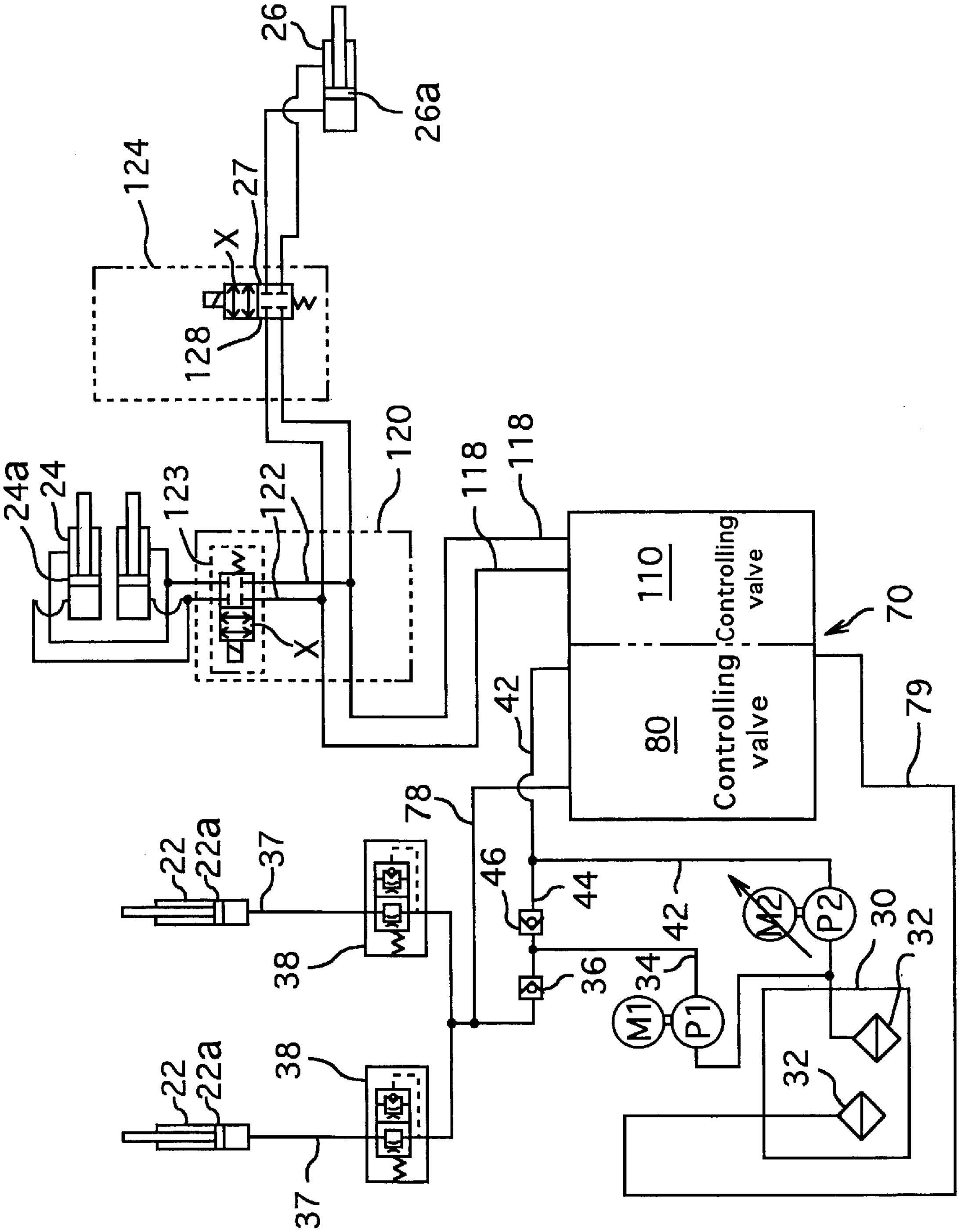
FIG. 2 is a preferred embodiment (hydraulic circuit diagram) of the present invention.

A forklift 10 show in FIG. 1 has, at front side thereof a lifting device 12 including a fork 14, reach mechanism 16 and tilt mechanism (not shown) which are respectively connected to a lift cylinder 22, reach cylinder 24 and, tilt cylinder 26 shown in FIG. 2.

Here, lift cylinder 22 is disposed vertically, and a piston 22*a* thereof is lifted when the hydraulic pressure is supplied to the bottom of lift cylinder 22, and is lowered by its own gravity. The reach cylinder 24 and tilt cylinder 26 are disposed horizontally, and pistons 24*a* and 26*a* thereof are shifted forwardly or rearwardly when the hydraulic pressure is supplied to one end or other end of each cylinder 24 or 26. All of these fork 14, reach mechanism 16 and tilt mechanism are driven and controlled by a hydraulic circuit shown in FIGS. 2 and 3.

The hydraulic circuit of FIG. 2 includes an oil tank 30 for storing an oil therein, first and second hydraulic pumps P1 and P2 for supplying the oil under pressure, first and second electric motors M1 and M2 for respectively driving the first and second hydraulic pumps P1 and P2, a flow controlling valve 70 for controlling flowing of the oil. In detail, a route 34 extends from a filter 32 in the tank 30 to the reach cylinder 22, and on this route 34 the first hydraulic pump P1 and a check valve 36 which allows only the oil-flow from the first hydraulic pump P1 to the lift cylinder 22 are disposed. The first hydraulic pump P1 is driven by the first electric motor M1 controlled by a first lever 11 (FIG. 1). That is, the operated amount (angle) of the first lever 11 is detected by a contactor and potentiometer to rotate the electric motor M1 by the number of rotations corresponding to the operated amount of the first lever 11. The route 34 is branched into two routes 37 and is connected to each of two lift cylinders 22 via safetydown valves 38.

On the route 42, the second hydraulic pump P2 and the flow controlling valve 70 are disposed. The second hydraulic pump P2 is controlled by the second electric motor M2 which is PWM controlled or chopper controlled by a second lever 13 (FIG. 1). Between the routes 34 and 42, a check valve 46 allowing only the oil flow from the route 34 to the route 42 is disposed. Both of the first and second electric motors M1 and M2 are supplied power from a battery (not shown).

Figure 3:
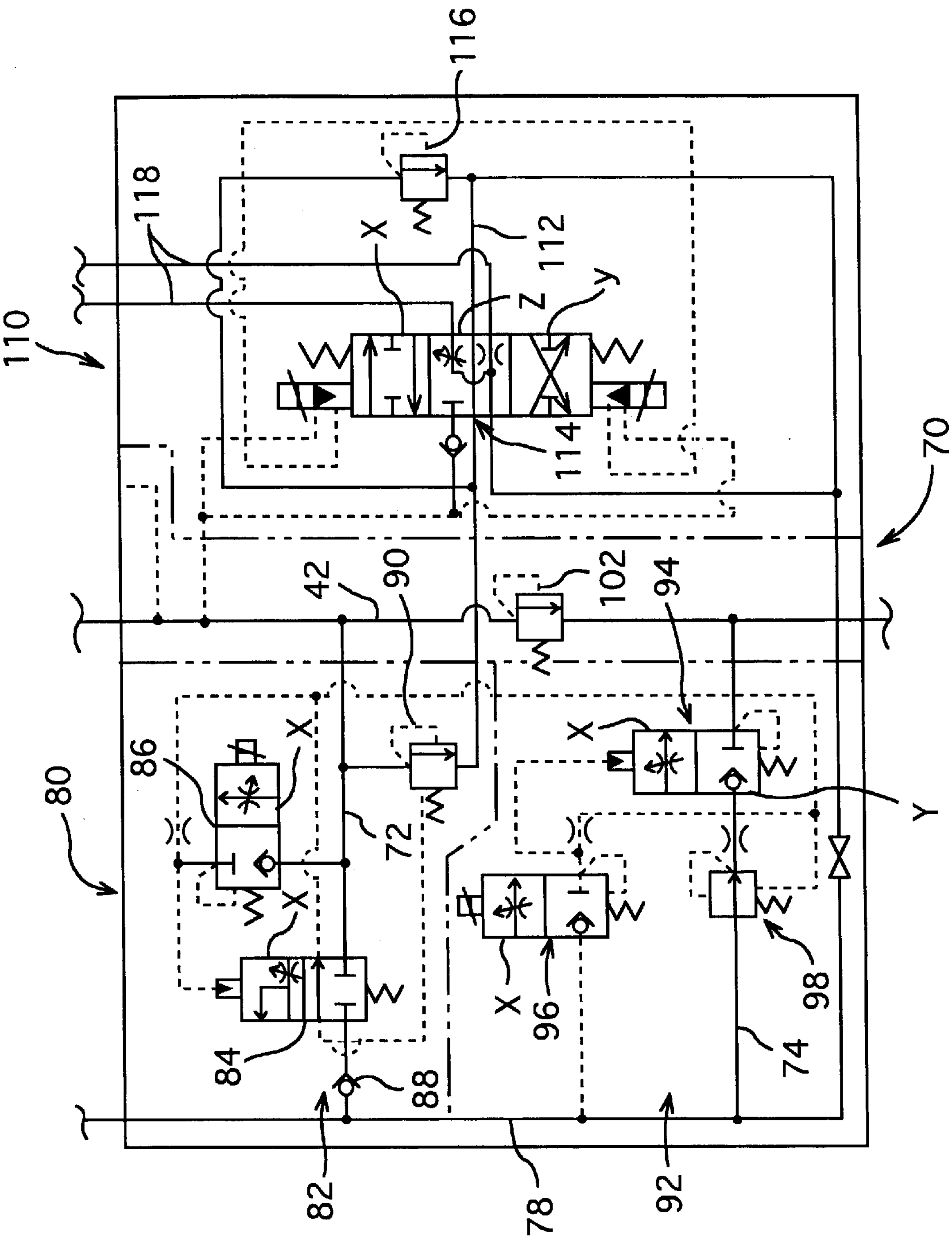
FIG. 3 is a partially enlarged view of FIG. 2.

As shown in FIG. 3, the flow controlling valve 70 is comprised of a first adjusting valve for a lift controlling portion 80 including a fork lifting controlling portion 82 and a fork lowering controlling portion 92, and a second adjusting valve 110 for reach and tilt mechanism controllings. The fork lifting controlling portion 82 has a first adjusting valve 84 of two ports two positions type disposed on a route 72 extending from the route 42 to the route 78, a first electro-magnetic valve of two ports two positions type and acting onto the adjusting valve 84, check valve 88 allowing only oil-flow from the route 42 to 78, and a relief valve 90. The fork lowering controlling portion 92 has a second adjusting valve 94 of two ports two positions type disposed on a route 74 extending from the route 78 to the route 42, a second electro-magnetic valve 96 of two ports two positions type and acting onto the adjusting valve 94, and a flow regulator for compensating pressure 98. On the route 42 a relief valve 102 for the first controlling valve 70 is disposed. Here, the fork lifting controlling portion 82 and the fork lowering controlling portion 92 are arranged in parallel, but they can be arranged in series.

The second controlling valve 110 includes an electro-magnetic valve 114 of four ports three positions type and is disposed on a route 112 branched from the route 42. The position x of the second controlling valve 110 is for shifting the pistons 24*a* and 26*a* in the reach cylinder 24 and tilt cylinder 26 forwardly, the position y thereof is for shifting the pistons 24*a* and 26*a* rearwardly, and the position z is neutral. On a route 112 a port relief 116 is disposed.

The second controlling valve 110 is connected to the reach cylinder 24 and tilt cylinder 26 by a route (hose between mast) 118. Returning to FIG. 2, the route 118 is connected to the two cylinders 24 via an oil controlling valve 120 of four ports two positions type and including an electro-magnetic valve 123 of four ports two positions type disposed on a route 122. The route 118 is connected to the tilt cylinder 26 via an oil controlling valve 124 including electro-magnetic valves 126 of four ports two positions type.

The above hydraulic circuit operates as below.

1) Fork

Since the fork 14 is lifted with supporting the load thereon large driving force is required to drive the piston 22*a* in the lift cylinder 22. Also, the fork 14 requires to be shifted in high speed over long stroke or to be inched little by little, as the occasion demands, as mentioned above.

i) High-speed Lifting

In the high speed and one stroke lifting of the fork 14, both of the first and the second hydraulic pumps P1 and P2 are driven by the first and the second electric motors M1 and M2, respectively. When the driver operates the first lever 11 corresponding to weight of the load supported on the fork 14 the first electric motor M1 is turned on to rotate by the number of rotations corresponding to weight of the load, the first hydraulic pump P1 supplies the oil via the routes 34 and 37.

On the other hand, the second electric motor M2 is PWM-controlled by operation of the second lever 13. The full-stroke operation of the second lever 13 causes the rotation of the second electric motor M2 in high speed and changing of the first electro-magnetic valve 86 to the x-position to change the first adjusting valve 84 to the x-position for opening it to the maximum. Thus, the oil flows little by little through the routes 72 and 78 and joins with the oil flowing through the route 34 to be flown into the bottom portion of lift cylinder 22. Thus, the fork 14 is lifted by large hydraulic force in high speed.

Operation of the second hydraulic pump P2 upon high-speed lifting of the fork 14, in addition to the first hydraulic pump P1, is effective to shorten the operating time of the piston 22*a* and to shift the piston 22*a* with large hydraulic force. That is, at the time when operation of the first hydraulic pump P1 is started, the piston 22*a* is already lifted up to predetermined height by the second hydraulic pump P2, and after operation of the first hydraulic pump P1 started, the fork 14 is shifted by sum of lifting force of the first and second hydraulic pumps P1 and P2. However, it is possible to shift the fork 14 only by the first hydraulic pump P1. Also, small amount of oil in the route 34 flows into the route 42 via the check valve 46 to operate the relief valve 102.

Further, the check valve 36 disposed on the route 34 prevents reverse flowing of the oil in the lift cylinder 22 after lifting the fork 14, so that unexpected lowering of the fork 14 is avoided. The electro-magnetic valve 114 of the second controlling valve 110 is in the neutral position at this time.

ii) Inching

The inching of the fork 14 is performed by operating only the second lever 13, that is by driving only second hydraulic pump P2 and the second electric motor M2, without operating the first lever i.e. the first hydraulic pump P1 and the first electric motor M1. That is, corresponding to amount or height of the inching, the second lever 13 is operated in the predetermined amount. As a result, the second electric motor M2 is PWM controlled corresponding to the operated amount of the second lever 13, and the first electro-magnetic valve 86 in the lifting controlling portion 82 is operated. That is, the second electric motor M2 rotates in relatively slower speed and the first electro-magnetic valve 86 is changed to the x-position to change the first adjusting valve 84 to the x-position for restricting an opened area thereof. Thus, the relatively smaller about of oil flows through the route 72 and 78 to reach to the lift cylinder 22. Here, the check valve 46 prevents flow-in of the oil from the route 42 to the route 34. The second electro-magnetic valve 94 of the lowering controlling portion 92 is closed at this time.

iii) Lowering

For lowering the fork 14, the first and second lever 11 and 13 are returned to the original position. As a result, the first and second electric motor M1 and M2 are stopped, and the flow controlling valve 70 changes from the lifting controlling portion 8 2 to the lowering controlling portion 92. That is, the second electro-magnetic valve 96 in the lower controlling portion 92 is switched to the x-position to switch the second adjusting valve 94 to x-position. In this way, the oil in the bottom portion of the lift cylinder 22 returns through the routes 78, 74 and 79 to the tank 30.

2) Reach and Tilt

For operating the reach mechanism 16 and tilt mechanism, the surplus oil not supplied to the lift cylinder 22 in inching the fork 14 is supplied to the reach cylinder 24 and tilt cylinder 26. This is because for the reach and tilt the pistons 24*a* and 26*a* had better be shifted in slow speed, similar to lifting of the piston 22*a* upon inching. That is, corresponding to operation of the second lever 13, the electro-magnetic valve 114 in the second controlling valve 110 switches to the x-position, and both of the electro-magnetic valves 123 and 126 of the reach and tilt switch to the x-position respectively. Thus, the reach and tilt mechanism operate forwardly and rearwardly.

According to the above embodiment, the following advantages can be obtained.

1) Regarding the high speed lifting of the fork 14, since the first electric motor M1 is switched by the contactor, the voltage decrease by the chopper which controls the second electric motor M2 can be reduced, so that the driving efficiency of the electric motors M1 and M2 by the battery is increased. Also, the oil fed out from the first hydraulic pump P1 only passes through the check valve 36 of which pressure loss is small, but does not passes through the flow controlling valve 70. Thus the oil supplying efficiency is increased, which enables the fork 14 to lift in high speed.

2) Regarding inching the fork 14, the first electric motor M 1 is not operated, and only the second electric motor M2 is operated since required amount of oil is small. Accordingly, total amount of oil supplied through the hydraulic circuit is reduced by half, so that not only the flow controlling valve 70 can be small-sized but the inching characteristic and the responding characteristic of the folk 14 are improved. Additionally, inertia of the second hydraulic pump M2 can be made small to improve responding characteristic on account of small size of the second hydraulic motor M2. Further, non-operation of the first electric motor M1 upon inching contributes to save the energy.

3) The first check valve 36 disposed on the route 34 from the first hydraulic pump P1 is hydraulically separated from the flow controlling valve 70 disposed on the route 42 from the second hydraulic pump P2 by the check valve 46. It is noted that the check valve 36 is small-size and therefore has flexibility in disposing, whereas the controlling valve 70 is large-size and has restriction in disposing. For this reason, an account of arrangement that the route 34 from the first hydraulic pump P1 to the lift cylinder 22 needs not to pass through the flow controlling valve 70, the first hydraulic pump P1 can directly supply the oil to the lift cylinder 22 by the shortest route.

4) The flow controlling valve 70 primarily provided for inching the fork 14 is commonly used for lifting the fork 14 in high speed, but only altered for the common usage is the first adjusting valve 84 (opened area thereof can be changed). Thus, increase of the cost for alteration is reduced to the minimum.

5) Finally, by paying attention to the common feature between the inching of fork and the operation of the reach and tilt mechanism, the oil not supplied to the lift cylinder 22 upon inching is used for operating the reach mechanism 16 etc. As a result, the reach mechanism 16 etc. can be operated without providing any special hydraulic pump or electric motor, so that the forklift having various function can be realized with simple hydraulic circuit.

Figure 4:
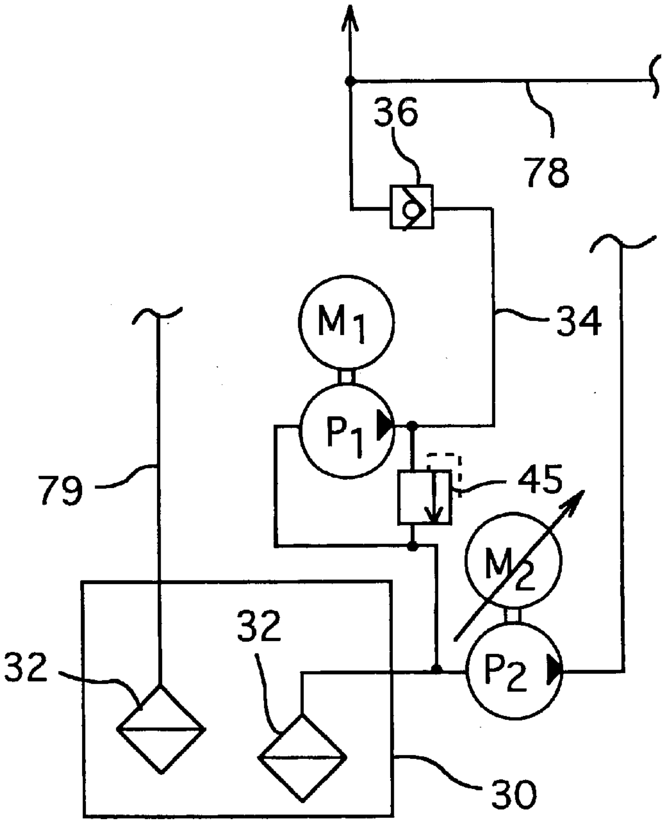
FIG. 4 shows deformation of a check valve in FIG. 2.
Figure 5:
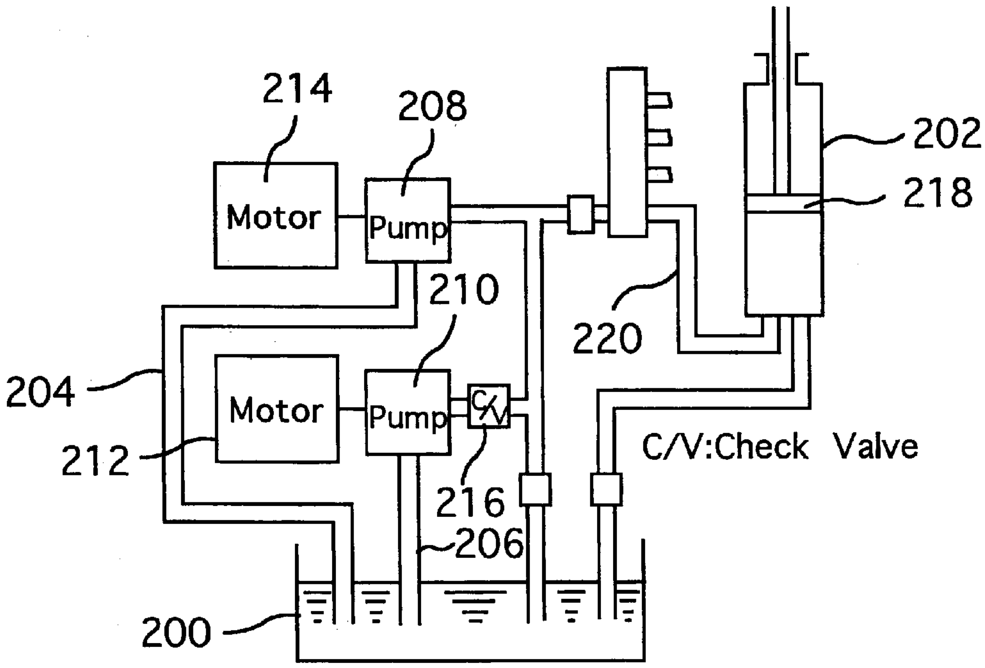
FIG. 5 (Prior Art)
FIG. 5 is a hydraulic circuit diagram showing a first related art.
Figure 6:
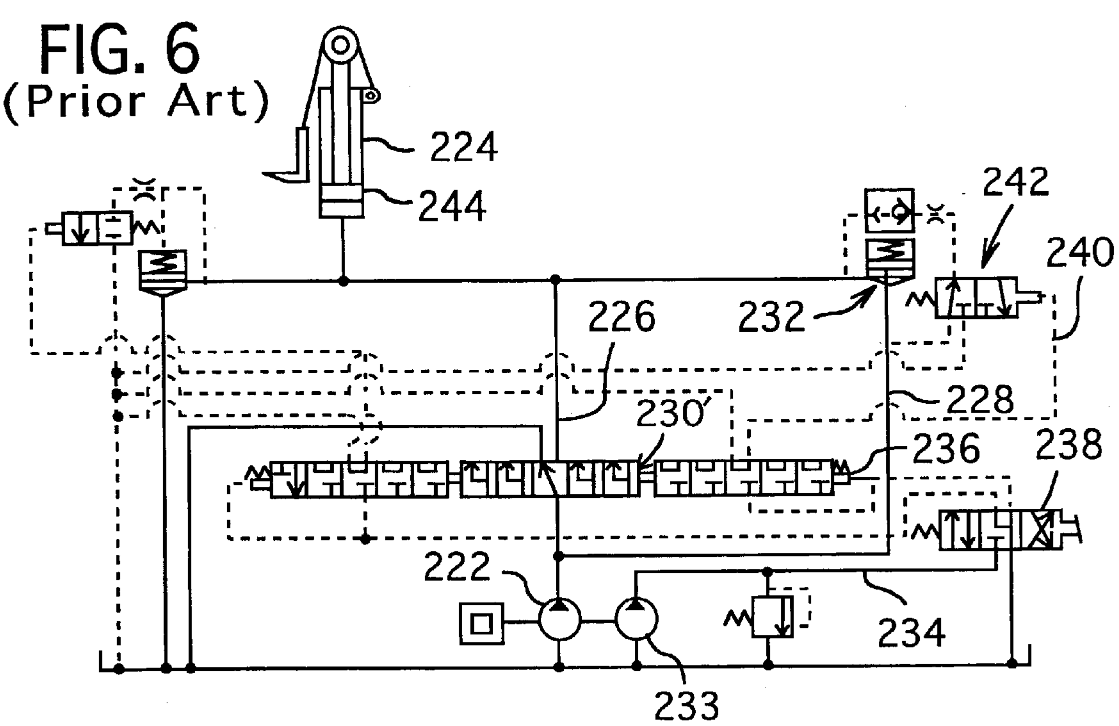
FIG. 6 (Prior Art)
FIG. 6 is a hydraulic circuit diagram showing a second related art.
Figure 8:
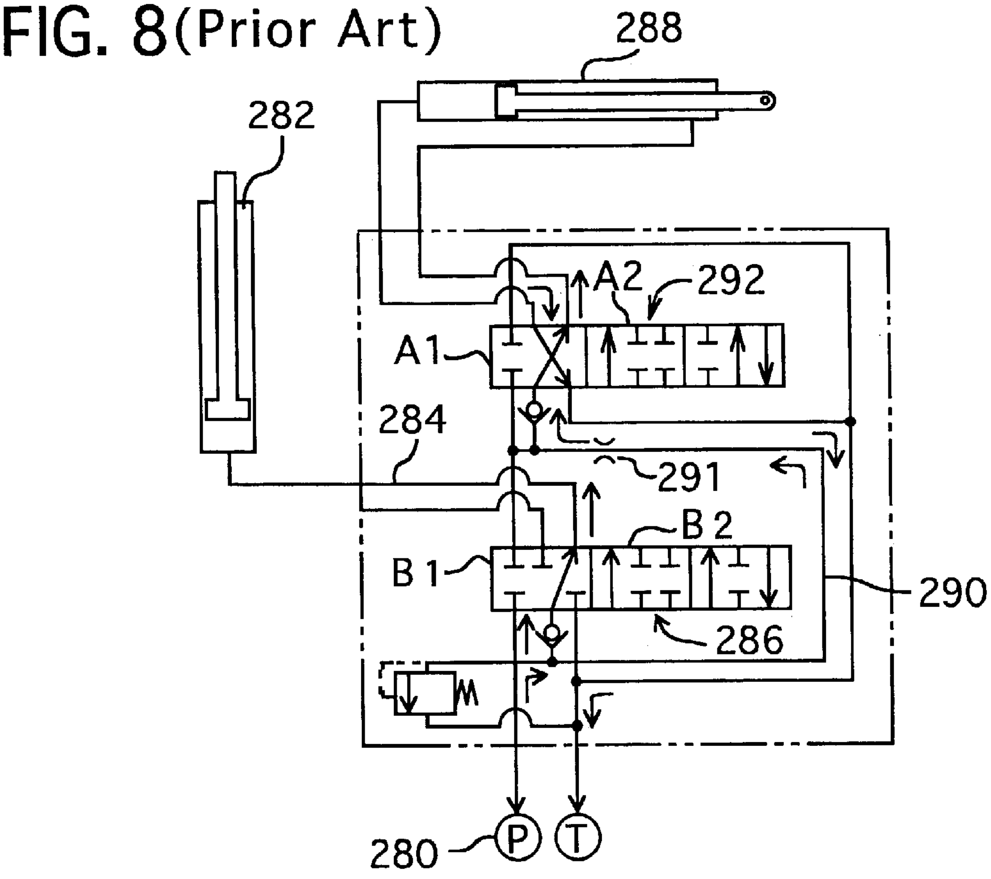
FIG. 8 (Prior Art)
FIG. 8 is a hydraulic circuit diagram showing a fourth related art.
Figure 7:
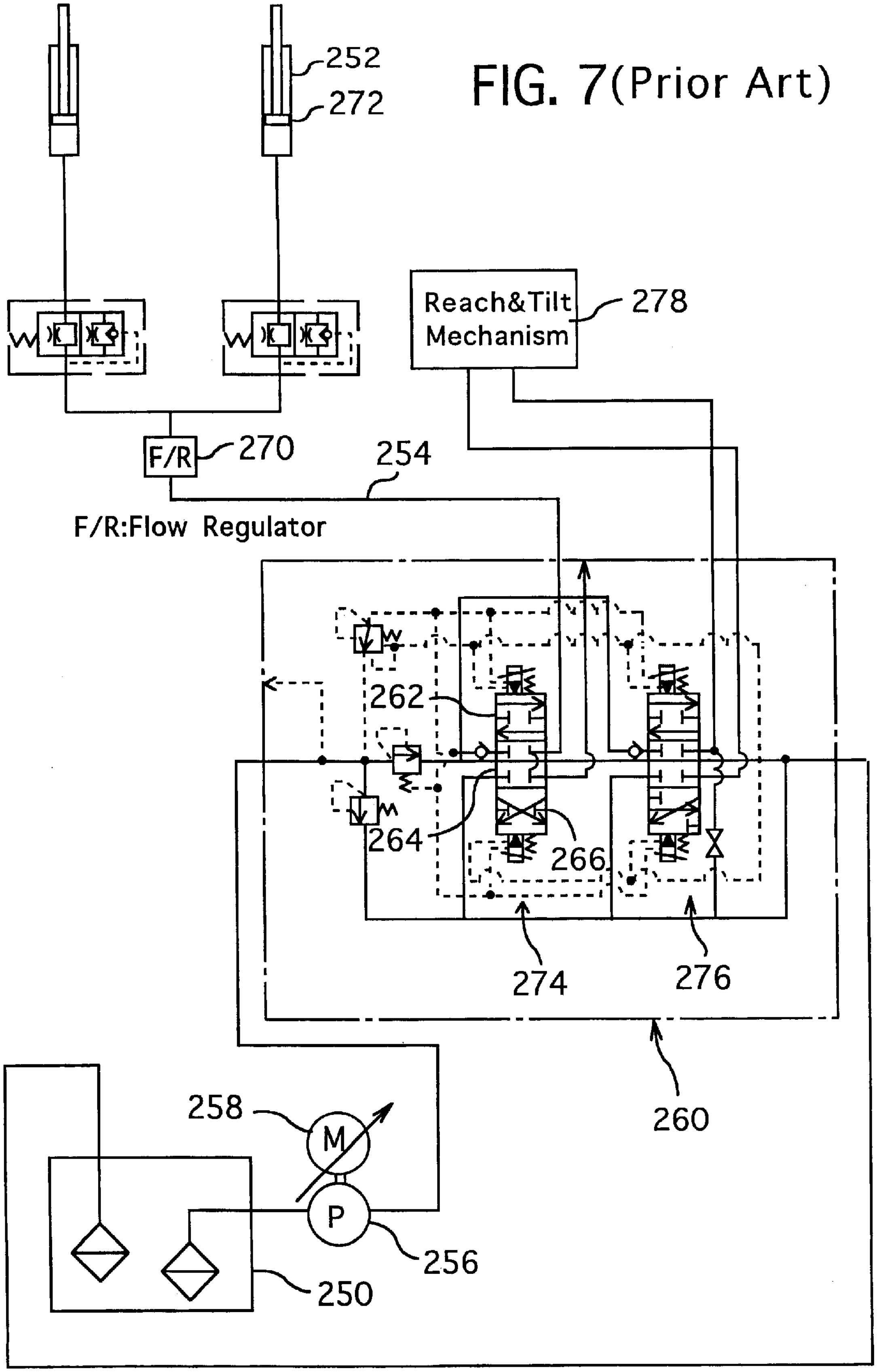
FIG. 7 (Prior Art)
FIG. 7 is a hydraulic circuit diagram showing a third related art.

Modified example of the above check valve 46 and the relief valve 102 is shown in FIG. 4.

In the above embodiment, the check valve 46 is disposed on the route 44 extending between the routes 34 and 42 to allow flowing of the oil supplied by the first hydraulic pump P1 upon high-speed lifting of the fork 14 to the route 42 for operating the relief valve 102. However, not only such arrangement requires additional labor for providing the route 44, but there is some risk of oil leakage in the route 44. In view of the above, in the modified example of FIG. 4, instead of providing the route 44 and the checking valve 46 thereon, the relief valve 45 is provided in the second hydraulic pump P2 disposed on the route 34.

By providing the relief valve 45 in the second hydraulic pump M2, the route 44 in the above embodiment can be omitted, so that cost therefor can be reduced and risk of oil leakage can be removed, thereby improving responsibility of the hydraulic circuit.

What is claimed is:

1. A hydraulic circuit for supplying an oil from an oil tank to at least a lift cylinder for lifting a fork for lifting, comprising:

a first route extending from the oil tank to the lift cylinder;

a first hydraulic pump disposed on said first route;

a first electric motor on-off controlled for driving said first hydraulic pump;

a first check valve disposed on said first route downstream of said first hydraulic pump for allowing only an oil-flow from the oil tank to the lift cylinder;

a second route extending from the oil tank to the lift cylinder;

a second hydraulic pump disposed on said second route;

a second electric motor PWM controlled for driving said second hydraulic pump;

a flow controlling valve disposed on said second route down stream of said second hydraulic pump and including an electro-magnetic valve operated associating with the chopper-controlling of said second hydraulic motor; and separating means for hydraulically separating said check valve and said electro-magnetic valve of said flow controlling valve.

2. A hydraulic circuit according to claim 1, wherein for lifting the fork in high speed both of said first hydraulic pump and second hydraulic pump are operated, and for inching the fork only said second hydraulic pump is operated.

3. A hydraulic circuit according to claim 2, wherein said second electric motor rotates in high speed upon high-speed lifting of the fork, and rotates in low speed upon inching of the fork.

4. A hydraulic circuit according to claim 1, wherein for lifting the fork in high speed at least said first hydraulic pump is operated, and for inching the fork only said second hydraulic pump is operated.

5. A hydraulic circuit according to claim 1, wherein said separating means is a second check valve disposed between a portion on said first route between said first hydraulic pump and said first check valve, and a portion on said second route between said second hydraulic pump and said flow controlling valve, said second check valve allowing only oil flow from said check valve to said flow controlling valve.

6. A hydraulic circuit according to claim 1, wherein said separating means is a relief valve disposed in said first hydraulic pump disposed on said first route.

7. A hydraulic circuit according to claim 1, wherein said flow controlling valve has a fork lifting controlling portion and a fork lowering controlling portion.

8. A hydraulic circuit according to claim 7, wherein said fork lifting controlling portion and said fork lowering controlling portion are arranged in parallel.

9. A hydraulic circuit according to claim 8, wherein a relief valve for said flow controlling valve is disposed between said fork lifting controlling portion and said fork lowering controlling portion.

10. A hydraulic circuit according to claim 7, wherein said fork lifting controlling portion and said fork lowering controlling portion are arranged in series.

11. A hydraulic circuit according to claim 10, wherein a relief valve for said flow controlling valve is disposed between said fork lifting controlling portion and said fork lowering controlling portion.

12. A hydraulic circuit according to claim 1, wherein a third route is branched from said flow controlling valve on said first route to at least one of a reach cylinder and tilt cylinder, on said third route a second flow controlling valve including a second electro-magnetic valve being disposed.

13. A hydraulic circuit according to claim 1, wherein said electro-magnetic valve acts onto an adjusting valve in said flow controlling valve so that an opened area thereof is changed large in high-speed lifting of the fork, and is changed small in inching the fork.

* * * * *

UNITED STATES PATENT AND TRADEMARK OFFICE

CERTIFICATE OF CORRECTION

PATENT NO. : 6,293,099 B1 | Page 1 of 1
DATED : September 25, 2001
INVENTOR(S) : Kazushi Kamiya It is certified that error appears in the above-identified patent and that said Letters Patent is hereby corrected as shown below:

Column 2,
Line 32, there should not be a separate paragraph please change
"motor 258 maximum.
In this way," to -- motor 258 maximum. In this way, --;

Line 61, please change
"position B1 and the pump" to -- position B1, and the pump --;

Line 65, there should not be a separate paragraph please change
"282 suitably.
When only the reach is driven," to -- 282 suitably. When only the reach is driven, --;

Column 6,
Line 5, please change
"the first lever i.e." to -- the first lever 11 i.e. --;

Column 16,
Lines 62-63 please change
"characteristic of the folk 14" to -- characteristic of the fork 14 --;

Signed and Sealed this

Twenty-eighth Day of May, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,293,099 B1 
DATED : September 25, 2001
INVENTOR(S) : Kazushi Kamiya It is certified that error appears in the above-identified patent and that said Letters Patent is hereby corrected as shown below:

Column 2,
Line 32, there should not be a separate paragraph please change "motor 258 maximum. In this way," to -- motor 258 maximum. In this way, --;
Line 61, please change "position B1 and the pump" to -- position B1, and the pump --;
Line 65, there should not be a separate paragraph please change "282 suitably. When only the reach is driven," to -- 282 suitably. When only the reach is driven, --;

Column 6,
Line 5, please change "the first lever i.e." to -- the first lever 11 i.e. --;

Column 16,
Lines 62-63 please change "characteristic of the folk 14" to -- characteristic of the fork 14 --;

Signed and Sealed this

Twenty-first Day of May, 2002

*Attest:*

JAMES E. ROGAN

*Attesting Officer* *Director of the United States Patent and Trademark Office*

UNITED STATES PATENT AND TRADEMARK OFFICE

CERTIFICATE OF CORRECTION

PATENT NO. : 6,293,099 B1 
DATED : September 25, 2001
INVENTOR(S) : Kazushi Kamiya It is certified that error appears in the above-identified patent and that said Letters Patent is hereby corrected as shown below:

Column 2,
Line 32, there should not be a separate paragraph please change "motor 258 maximum.
In this way," to -- motor 258 maximum. In this way, --;
Line 61, please change "position B1 and the pump" to -- position B1, and the pump --;
Line 65, there should not be a separate paragraph please change "282 suitably.
When only the reach is driven," to -- 282 suitably. When only the reach is driven, --;

Column 6,
Line 5, please change "the first lever i.e." to -- the first lever 11 i.e. --;

Column 16,
Lines 62-63 please change "characteristic of the folk 14" to -- characteristic of the fork 14 --;

This certificate supersedes Certificate of Correction issued May 28, 2002 since this patent number did not appear on the Certificate of Correction listing for May 28, 2002

Signed and Sealed this

Thirtieth Day of July, 2002

*Attest:*

JAMES E. ROGAN